United States Patent
Ren et al.

(10) Patent No.: US 11,178,697 B2
(45) Date of Patent: Nov. 16, 2021

(54) RANDOM ACCESS METHOD AND TERMINAL

(71) Applicant: CHINA ACADEMY OF TELECOMMUNICATIONS TECHNOLOGY, Beijing (CN)

(72) Inventors: Bin Ren, Beijing (CN); Tony Ekpenyong, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/476,044

(22) PCT Filed: Feb. 12, 2018

(86) PCT No.: PCT/CN2018/076480
§ 371 (c)(1),
(2) Date: Jul. 3, 2019

(87) PCT Pub. No.: WO2018/127239
PCT Pub. Date: Jul. 12, 2018

(65) Prior Publication Data
US 2019/0357265 A1 Nov. 21, 2019

(30) Foreign Application Priority Data
Jan. 6, 2017 (CN) .......................... 201710010893.1

(51) Int. Cl.
*H04W 74/02* (2009.01)
*H04W 74/08* (2009.01)
(Continued)

(52) U.S. Cl.
CPC ... *H04W 74/0833* (2013.01); *H04W 72/0446* (2013.01); *H04W 72/0453* (2013.01); *H04W 74/006* (2013.01)

(58) Field of Classification Search
CPC ......... H04W 72/0446; H04W 72/0453; H04W 74/006; H04W 74/0833
See application file for complete search history.

(56) References Cited

U.S. PATENT DOCUMENTS

2008/0233941 A1 9/2008 Jen
2008/0316961 A1* 12/2008 Bertrand ............... H04L 5/0051
370/329

(Continued)

FOREIGN PATENT DOCUMENTS

CN 101128028 A 2/2008
CN 101772181 A 7/2010
(Continued)

OTHER PUBLICATIONS

International Search Report in the international application No. PCT/CN2018/076480, dated May 4, 2018.
(Continued)

*Primary Examiner* — Asad M Nawaz
*Assistant Examiner* — Zhaohui Yang
(74) *Attorney, Agent, or Firm* — Ladas & Parry, LLP

(57) ABSTRACT

A random access method and a terminal are provided. The random access method comprises: receiving random access mechanism configuration information sent by a base station, wherein the random access mechanism configuration information includes a random access type and random access time-frequency resource information corresponding to the random access type, and the random access type includes a first random access mechanism and/or a second random access mechanism; and performing a random access process
(Continued)

of the first random access mechanism or the second random access mechanism according to the random access mechanism configuration information.

17 Claims, 3 Drawing Sheets

(51) Int. Cl.
*H04W 72/04* (2009.01)
*H04W 74/00* (2009.01)

(56) References Cited

U.S. PATENT DOCUMENTS

| | | | |
|---|---|---|---|
| 2011/0116364 A1 | 5/2011 | Zhang et al. | |
| 2011/0235609 A1 | 9/2011 | Ahn et al. | |
| 2012/0147830 A1 | 6/2012 | Lohr et al. | |
| 2013/0039314 A1 | 2/2013 | Prateek et al. | |
| 2014/0334389 A1* | 11/2014 | Abdel-Samad | H04W 76/30 370/329 |
| 2015/0156760 A1 | 6/2015 | Yu et al. | |
| 2016/0338114 A1 | 11/2016 | Shimizu | |
| 2016/0359653 A1* | 12/2016 | Lee | H04W 74/085 |
| 2018/0110074 A1* | 4/2018 | Akkarakaran | H04W 72/0413 |
| 2018/0110075 A1* | 4/2018 | Ly | H04W 74/0833 |
| 2018/0279186 A1* | 9/2018 | Park | H04W 36/30 |

FOREIGN PATENT DOCUMENTS

| | | |
|---|---|---|
| CN | 103748942 A | 4/2014 |
| CN | 104754758 A | 7/2015 |
| WO | 2012177060 A2 | 12/2012 |
| WO | 2014023026 A1 | 2/2014 |

OTHER PUBLICATIONS

First Office Action in Chinese Application No. 201710010893.1 dated Dec. 27, 2018.
CATT Discussion of Simplified RACH Procedures R1-1611376 3GPP TSG RAN WG1 Meeting #87, Nov. 11, 2016.
Interdigital Communications Random Access Procedure R1-1612311 3GPP TSG-RAN WG1 #87, Nov. 18, 2016.
Second Office Action in Chinese Application No. 201710010893.1, dated Jun. 4, 2019.
First Office Action in Taiwanese Application No. 107104652, dated Aug. 24, 2018.
3GPP TSG-RAN WG2 #96 Tdoc R2-168665, "Random Access enhancements", Nov. 2016.
International Preliminary Report on Patentability in the international Application No. PCT/CN2018/076480, dated Jul. 9, 2019.

* cited by examiner

RANDOM ACCESS METHOD AND TERMINAL

CROSS-REFERENCE TO RELATED APPLICATIONS

This application is the U.S. national phase of PCT Application No. PCT/CN2018/076480 filed on Feb. 12, 2018, which claims priority to Chinese Patent Application No. 201710010893.1 filed on Jan. 6, 2017, the entire contents of which are incorporated herein by reference.

TECHNICAL FIELD

The present disclosure relates to the technical field of communications, and in particular to a random access method and a terminal.

BACKGROUND

A four-step random access mechanism is applied in a related Long Term Evolutionary (LTE) protocol. As shown in FIG. 1, the main implementation process of the four-step random access mechanism is described as follows.

In step 11, a terminal sends a random access preamble (namely an Msg1 message) to a base station;

in step 12, the base station feeds back a random access response (RAR, namely an Msg2 message) to the terminal;

in step 13, the terminal sends a scheduled transmission message (namely an Msg3 message), wherein the Msg3 message includes layer 2/layer 3 (L2/L3) random access information; and in step 14, the base station sends a contention resolution message (namely an Msg4 message) to the terminal.

In the $5^{th}$ generation mobile communication system (5G) New Radio (NR), a problem of large latency in a control plane exists in an uplink multi-beam physical random access channel (PRACH) transmission, and the low latency performance index defined for an Ultra-Reliable and Low Latency Communications (URLLC) scenario cannot be met. In a processing method for effectively reducing the control plane processing latency, a two-step random access mechanism is currently discussed in NR. As shown in FIG. 2, the main implementation process of the two-step random access mechanism is described as follows.

In step 21, the terminal sends a random access preamble and data (Random Access Preamble+Data, namely an Msg1 message) to the base station, wherein the Msg1 message includes identification information of the terminal (namely UE ID), a small data packet, and the like; and in step 22, the base station feeds back a random access response (RAR, namely an Msg2 message) to the terminal.

It should be noted that the difference between the two-step random access mechanism of the NR and the four-step random access mechanism of the LTE is that the Msg1 sends the random access preamble and data simultaneously, and the content of the data bearer corresponds to the content of Msg3 in the four-step random access mechanism.

How to configure two different random access mechanisms and the processing method of the user equipment (UE) are not yet defined in the 5G NR. If the four-step random access mechanism is completely applied, there may be a problem that the control plane has a large processing latency; and if the two-step random access mechanism is completely applied, there may be problems that part of data will have a high probability of collision and the utilization rate of some data is low.

SUMMARY

The technical problem to be solved by the present disclosure is to provide a random access method and a terminal, so as to solve the problem that since how to use two different random access mechanisms is not yet defined in the related 5G NR, a large control plane processing latency, a high data plane collision probability and low utilization rate of some data resources cannot be solved effectively.

In order to solve the above technical problems, in a first aspect, some embodiments of the present disclosure provide a random access method, which includes:

receiving random access mechanism configuration information sent by a base station, wherein the random access mechanism configuration information includes a random access type and random access time-frequency resource information corresponding to the random access type, and the random access type includes a first random access mechanism and/or a second random access mechanism; and performing a random access process of the first random access mechanism or the second random access mechanism according to the random access mechanism configuration information.

Further, the random access time-frequency resource information includes at least one of a cell-level random access time-frequency resource and a user-level random access time-frequency resource.

Further, in a case that the random access type includes the first random access mechanism and the second random access mechanism, and the random access time-frequency resource information corresponding to the random access type is the cell-level random access time-frequency resource, the performing the random access process of the first random access mechanism or the second random access mechanism according to the random access mechanism configuration information further includes: determining, according to a service requirement of a terminal, whether the random access mechanism used by the terminal performing a random access is the first random access mechanism or the second random access mechanism, and performing the random access process of the selected first random access mechanism or the selected second random access mechanism, wherein the service requirement includes a service latency requirement and/or a service reliability requirement; or randomly determining one of the first random access mechanism and the second random access mechanism as the random access mechanism used by the terminal performing a random access, and performing the random access process.

Further, in a case that the random access time-frequency resource information corresponding to the random access type is the user-level random access time-frequency resource, the performing the random access process of the first random access mechanism or the second random access mechanism according to the random access mechanism configuration information further includes: triggering the random access process of the first random access mechanism or the second random access mechanism by using a preset preamble on the random access time-frequency resource specified in the random access mechanism configuration information.

Further, in a case that the random access type includes the first random access mechanism and the second random access mechanism, the random access time-frequency resource information corresponding to the first random access mechanism and the random access time-frequency resource information corresponding to the second random access mechanism are configured on the same or different sub-bands.

Further, in a case that the random access type includes the second random access mechanism, a preamble and data of the second random access mechanism are configured in a time division multiplexing manner or a frequency division multiplexing manner.

Further, in a case that the random access type includes the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot.

Further, the random access mechanism configuration information further includes a preamble allocated for the random access type, a preset random access preamble is divided into a first set and a second set, the first set corresponds to the first random access mechanism, and the second set corresponds to the second random access mechanism.

Further, the receiving the random access mechanism configuration information sent by the base station includes: receiving the random access mechanism configuration information notified by the base station through a downlink broadcast channel or a downlink dedicated control signaling.

In a second aspect, some embodiments of the present disclosure provide a terminal, which includes: a receiving module, configured to receive random access mechanism configuration information sent by a base station, where the random access mechanism configuration information includes a random access type and random access time-frequency resource information corresponding to the random access type, and the random access type includes a first random access mechanism and/or a second random access mechanism; and an execution module, configured to perform a random access process of the first random access mechanism or the second random access mechanism according to the random access mechanism configuration information.

Further, the random access time-frequency resource information includes at least one of a cell-level random access time-frequency resource and a user-level random access time-frequency resource.

Further, in a case that the random access type includes the first random access mechanism and the second random access mechanism, and the random access time-frequency resource information corresponding to the random access type is the cell-level random access time-frequency resource, the execution module is configured to: determine, according to a service requirement of the terminal, whether the random access mechanism used by the terminal performing a random access is the first random access mechanism or the second random access mechanism, and perform the random access process of the selected first random access mechanism or the selected second random access mechanism, wherein the service requirement includes a service latency requirement and/or a service reliability requirement; or randomly determine one of the first random access mechanism and the second random access mechanism as the random access mechanism used by the terminal performing a random access, and perform the random access process.

Further, in a case that the random access time-frequency resource information corresponding to the random access type is the user-level random access time-frequency resource, the execution module is configured to: trigger the random access process of the first random access mechanism or the second random access mechanism by using a preset preamble on the random access time-frequency resource specified in the random access mechanism configuration information.

Further, in a case that the random access type includes the first random access mechanism and the second random access mechanism, the random access time-frequency resource information corresponding to the first random access mechanism and the random access time-frequency resource information corresponding to the second random access mechanism are configured on the same or different sub-bands.

Further, in a case that the random access type includes the second random access mechanism, a preamble and data of the second random access mechanism are configured in a time division multiplexing manner or a frequency division multiplexing manner.

Further, in a case that the random access type includes the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot.

Further, the random access mechanism configuration information further includes a preamble allocated for the random access type, a preset random access preamble is divided into a first set and a second set, the first set corresponds to the first random access mechanism, and the second set corresponds to the second random access mechanism.

Further, the receiving module is configured to receive the random access mechanism configuration information notified by the base station through a downlink broadcast channel or a downlink dedicated control signaling.

In a third aspect, some embodiments of the present disclosure provide a terminal, which includes: a processor, and a memory connected to the processor via a bus interface and configured to store computer instructions and data used by the processor in performing operations, wherein the computer instructions are called and executed by the processor to perform the method described in the first aspect above.

In a fourth aspect, some embodiments of the present disclosure provide a non-volatile storage medium, in which computer instructions and data are stored, wherein the computer instructions are called and executed by a processor to perform the method described in the first aspect above.

The present disclosure has the following advantageous effects. In the foregoing solutions, the terminal obtains the random access mechanism configuration information configured by the base station for the terminal, and then performs a random access process according to the configuration information. Therefore, the terminal can select a random access mechanism according to a service condition of the terminal itself, thereby solving the problems of a large control plane processing latency, a high data plane collision probability and low utilization rate of some data resources, and improving the reliability of random access.

DETAILED DESCRIPTION

To make the objects, technical solutions and advantages of the present disclosure clearer, the present disclosure will be described in detail below in connection with specific embodiments and the accompanying drawings.

In view of the problems that how to use two different random access mechanisms is not yet defined in the related 5G NR, and the problems of a large control plane processing latency, a high data plane collision probability and low utilization rate of some data resources, the present disclosure provides a random access method and a terminal.

Figure 1:
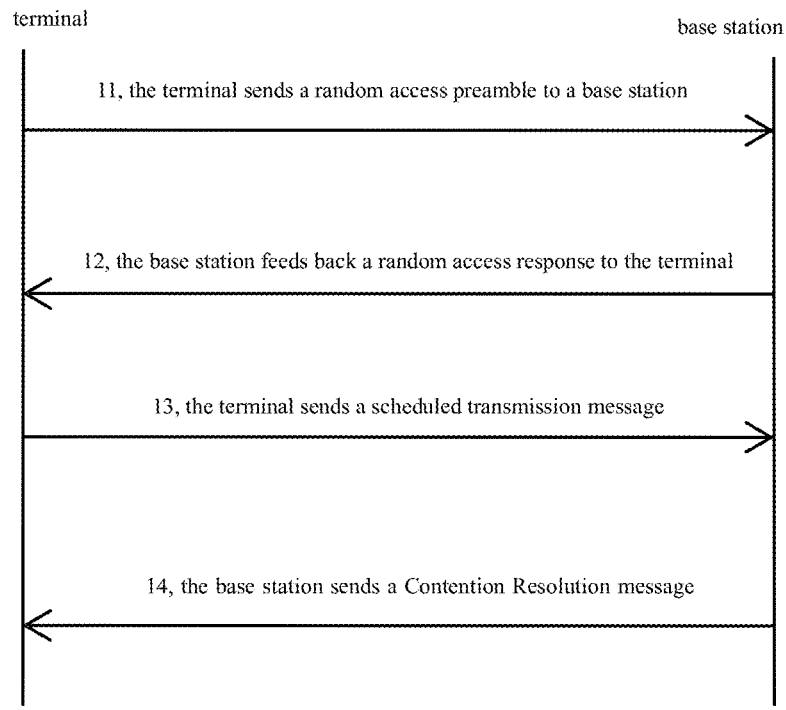
FIG. 1 shows a schematic diagram of a communication process of a four-step random access mechanism.
Figure 2:
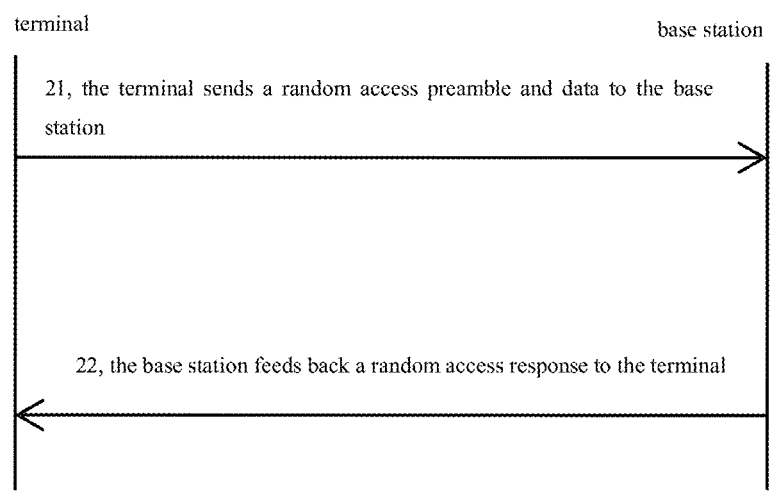
FIG. 2 shows a schematic diagram of a communication process of a two-step random access mechanism.
Figure 3:
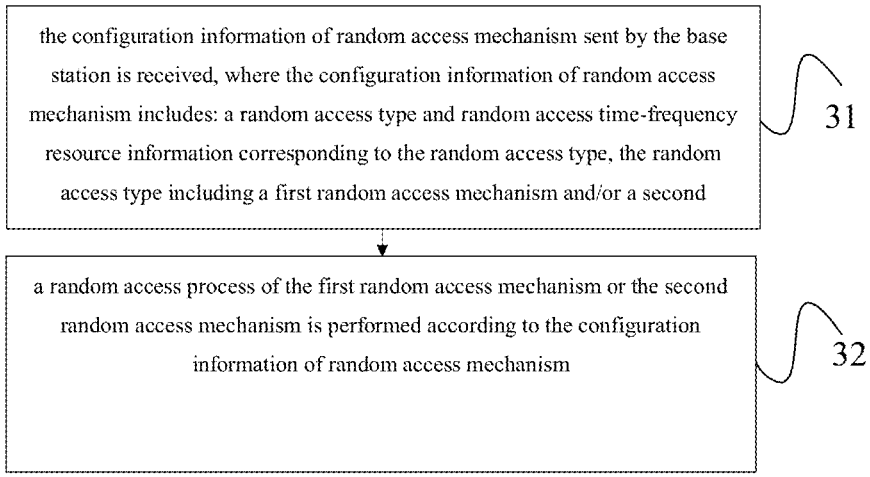
FIG. 3 shows a schematic flowchart of a random access method according to some embodiments of the present disclosure.

As shown in FIG. 3, some embodiments of the present disclosure provide a random access method, which includes steps 31 to 32.

In step 31, random access mechanism configuration information sent by a base station is received, wherein the random access mechanism configuration information includes a random access type and random access time-frequency resource information corresponding to the random access type, and the random access type includes a first random access mechanism and/or a second random access mechanism.

It should be noted that, in this embodiment, the base station needs to configure the random access mechanism configuration information in advance, and then send the configured information to a terminal. The random access mechanism configuration information may include a first random access mechanism and random access time-frequency resource information corresponding to the first random access mechanism (that is, the location of the time-frequency resource used by the terminal when it sends information in a case that the terminal uses the first random access mechanism for a random access). The random access mechanism configuration information may include a second random access mechanism and random access time-frequency resource information corresponding to the second random access mechanism (that is, the location of the time-frequency resource used by the terminal when it sends information in a case that the terminal uses the second random access mechanism for a random access). Since the related random access mechanism includes a four-step random access mechanism and a two-step random access mechanism, correspondingly, the first random access mechanism represents a four-step random access mecha-nism, and the second random access mechanism represents a two-step random access mechanism, in some embodiments of the present disclosure.

In step 32, a random access process of the first random access mechanism or the second random access mechanism is performed according to the random access mechanism configuration information.

It should be noted that the base station may send the random access mechanism configuration information through a downlink broadcast channel or a downlink dedicated control signaling. Accordingly, the terminal may receive the random access mechanism configuration information on the downlink broadcast channel or the downlink dedicated control signaling according to the sending condition of the base station.

Generally, the base station may configure only a four-step random access mechanism for the terminal, or configure only a two-step random access mechanism for the terminal. The base station may also configure the two random access mechanisms for the terminal, and the terminal itself decides which random access mechanism is used to perform a random access process.

It should be noted that the terminal needs to use a preamble to perform the random access process. In a case that the random access mechanism configuration information transmitted by the base station to the terminal does not include a preamble configured for the terminal, the terminal uses a preamble agreed with the base station to perform a random access. In a case that the random access mechanism configuration information transmitted by the base station to the terminal includes a set of preambles configured for the terminal, the terminal randomly selects a preamble in the set of preambles sent by the base station to perform a random access.

Specifically, the random access time-frequency resource information includes at least one of a cell-level random access time-frequency resource and a user-level random access time-frequency resource.

The cell-level random access time-frequency resource means that all users (namely terminals) in a cell may randomly select a preamble in a given set of preambles and send random access information on a given time-frequency resource. The user-level random access time-frequency resource means that the base station configures a fixed random access preamble and time-frequency resource for each user. If the random access time-frequency resource configured by the base station is the cell-level random access time-frequency resource, the base station performs traversal search and detection on all candidate preambles on the random access time-frequency resource; and if the random access time-frequency resource configured by the base station is the user-level random access time-frequency resource, the base station performs a fixed detection on the configured random access time-frequency resource and the preamble.

Specifically, in a case that the random access type includes the first random access mechanism and the second random access mechanism, and the random access time-frequency resource information corresponding to the random access type is the cell-level random access time-frequency resource, the implementations of the step 31 are described as follows.

In a first way, it is determined, according to a service requirement of the terminal, whether the random access mechanism used by the terminal performing a random access is the first random access mechanism or the second random access mechanism, and the random access process of the selected first random access mechanism or the selected second random access mechanism is performed.

It should be noted that the service requirement mainly includes a service latency requirement and/or a service reliability requirement. For example, if the service latency requirement is high, the two-step random access mechanism is used for a random access; otherwise, the four-step random access mechanism is used for a random access. For example, when the terminal performs a URLLC service, the two-step random access mechanism is preferentially used for a random access; and when other services are performed, the four-step random access mechanism is used for a random access. If the service reliability requirement is high, the four-step random access mechanism is used for a random access; otherwise, the two-step random access mechanism is used for a random access.

In a second way, one of the first random access mechanism and the second random access mechanism is randomly determined as the random access mechanism used by the terminal when it performs a random access, and a random access process is performed.

In the case of the second way, the random access mechanism used by the terminal is not limited, and the terminal may select any random access mechanism for a random access.

Specifically, in a case that the random access time-frequency resource information corresponding to the random access type is the user-level random access time-frequency resource, the implementation of the step 31 includes:

triggering the random access process of the first random access mechanism or the second random access mechanism by using a preset preamble on the random access time-frequency resource specified in the random access mechanism configuration information.

It should be noted that, since the user-level random access time-frequency resource is specified by the base station for the terminal, the terminal must perform a random access on the time-frequency resource, and the terminal needs to use the random access mechanism corresponding to the specified time-frequency resource for a random access in a case that the time-frequency resource meets a usage condition, according to the indication of the base station.

It should be noted that, in a case that the random access type includes the first random access mechanism and the second random access mechanism, the random access time-frequency resource information corresponding to the first random access mechanism and the random access time-frequency resource information corresponding to the second random access mechanism are configured on the same or different sub-bands. In a case that the two-step random access mechanism is configured by the base station for the terminal, a preamble and data of the two-step random access mechanism may be configured in a time division multiplexing (TDM) manner or a frequency division multiplexing (TDM) manner.

It should be also noted that, in a case that the random access type includes the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot. The random access mechanism configuration information further includes a preamble allocated for the random access type, a preset random access preamble is divided into a first set and a second set, the first set corresponds to the first random access mechanism, and the second set corresponds to the second random access mechanism.

The set of preambles of the random access used by the terminal is preset in the base station. Therefore, in a case that two random access mechanisms are configured by the base station for the terminal, the set of preambles may be divided into two parts, wherein one part is allocated for the two-step random access mechanism, and the other part is allocated for the four-step random access mechanism.

In practical applications, the above implementations of some embodiments of the present disclosure are exemplified below.

a. The base station configures two random access mechanisms by using different sub-bands, and configures a cell-level random access time-frequency resource for the two-step random access mechanism.

Figure 4:
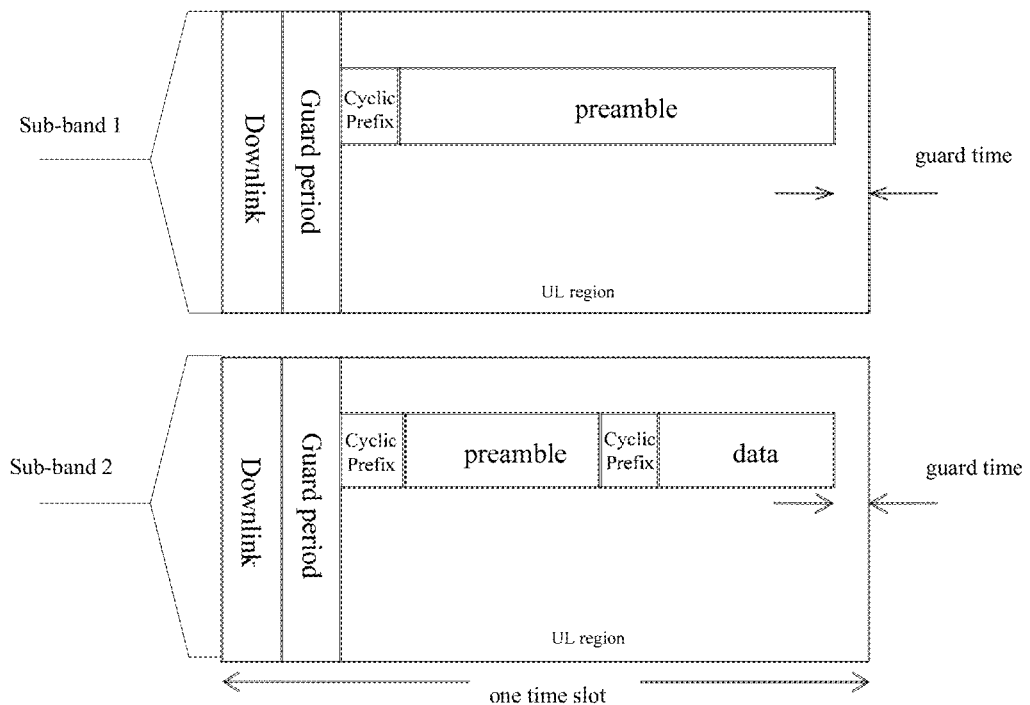
FIG. 4 shows a schematic diagram of configurations of a four-step random access mechanism and a two-step random access mechanism on sub-bands.

As shown in FIG. 4, the random access time-frequency resource of the four-step random access mechanism is configured by the base station on sub-band 1, the transmission location of a preamble of the four-step random access mechanism is configured by the base station in an uplink region (UL region) of one time slot of sub-band 1, the random access time-frequency resource of the two-step random access mechanism is configured by the base station on sub-band 2, and the transmission locations of a preamble and data of the two-step random access mechanism are configured by the base station in an uplink region (UL region) of one time slot of sub-band 2. The TDM way is used between the preamble and the data part of the two-step random access mechanism. For the random access time-frequency resource of the two-step random access, the base station configures a cell-level random access time-frequency resource. The base station performs traversal search and detection on the preamble and the time-frequency resource corresponding to the random access mechanism to determine whether there is user transmission.

The terminal determines, according to a service requirement, the random access mechanism to be used; for example, the terminal selects the random access mechanism according to the service latency requirement. For example, if the terminal needs to send an uplink URLLC service, the terminal selects the two-step random access mechanism; otherwise, the terminal selects the four-step random access mechanism. If the service reliability requirement is high, the four-step random access mechanism is used for a random access; otherwise, the two-step random access mechanism is used for a random access.

b. The base station configures two random access mechanisms by using different sub-bands, and configures a user-level random access time-frequency resource for the two-step random access mechanism.

Still referring to FIG. 4, the random access time-frequency resource of the four-step random access mechanism is configured by the base station on sub-band 1, the transmission location of a preamble of the four-step random access mechanism is configured by the base station in an uplink region (UL region) of one time slot of sub-band 1, the random access time-frequency resource of the two-step random access mechanism is configured by the base station on sub-band 2, and the transmission locations of a preamble and data of the two-step random access mechanism are configured by the base station in an uplink region (UL region) of one time slot of sub-band 2. For the random access time-frequency resource of the two-step random access, the base station configures a user-level random access time-frequency resource. The base station performs a fixed detection on the preamble and the time-frequency resource corresponding to the random access mechanism.

Based on the configuration of the base station, the terminal triggers, in all states (including an idle state, a connected state, and an inactive state), a corresponding random access mechanism on the corresponding random access time-frequency resource by using a given preamble.

c. The base station configures two random access mechanisms by using the same sub-band, and configures a cell-level random access time-frequency resource for the two-step random access mechanism.

Figure 5:
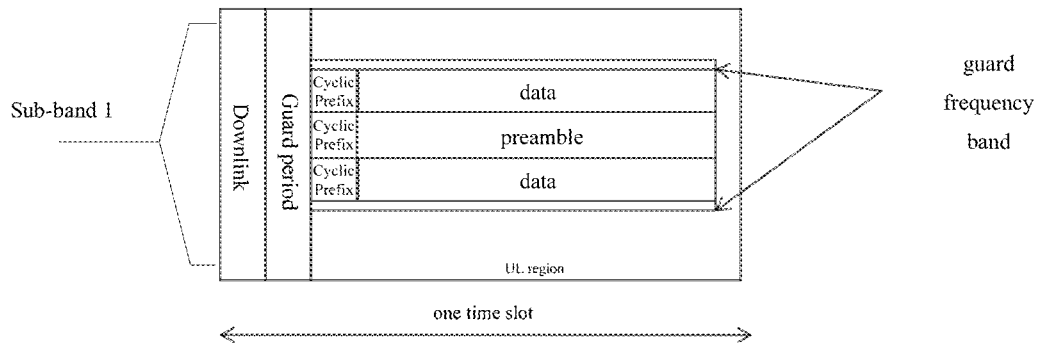
FIG. 5 shows a schematic diagram of configurations of a four-step random access mechanism and a two-step random access mechanism on a sub-band.

As shown in FIG. 5, the random access time-frequency resource of a two-step random access mechanism and the random access time-frequency resource of a four-step random access mechanism are simultaneously configured by the base station on sub-band 1, that is, the same time slot and sub-band are used for the two-step random access mechanism and the four-step random access mechanism. The FDM way is used between the preamble and the data part of the two-step random access mechanism. It is assumed that the set of random access preambles includes 64 preambles and is divided into two sub-sets, each of which includes 32 preambles, and the preambles in the two sub-sets are respectively used for the two-step random access mechanism and the four-step random access mechanism. For the random access time-frequency resource of the two-step random access, the base station configures a cell-level random access time-frequency resource. In this case, the base station performs traversal search and detection on the preamble and the time-frequency resource corresponding to the random access mechanism to determine whether there is user transmission.

The terminal may randomly select the random access mechanism to be used, based on the configuration of the base station.

d. The base station configures two random access mechanisms by using the same sub-band, and configures a user-level random access time-frequency resource for the two-step random access mechanism.

As shown in FIG. 5, the random access time-frequency resource of a two-step random access mechanism and the random access time-frequency resource of a four-step random access mechanism are simultaneously configured by the base station on sub-band 1, that is, the same time slot and sub-band are used for the two-step random access mechanism and the four-step random access mechanism. The FDM way is used between the preamble and the data part of the two-step random access mechanism. It is assumed that the set of random access preambles includes 64 preambles and is divided into two sub-sets, namely a sub-set including one preamble and a sub-set including 63 preambles, which are respectively used for the two-step random access mechanism and the four-step random access mechanism. In this case, for the random access time-frequency resource of the two-step random access mechanism, the base station equivalently configures a user-level random access time-frequency resource (that is, each user uses one preamble fixedly). The base station then performs a fixed detection on the preamble and the time-frequency resource corresponding to the random access mechanism on the random access time-frequency resource of the two-step random access mechanism; the base station performs traversal search and detection on the preamble and the time-frequency resource corresponding to the random access mechanism on the random access time-frequency resource of the four-step random access mechanism.

The terminal may randomly select the random access mechanism to be used, based on the configuration of the base station.

It should be noted that, according to the present disclosure, the large control plane processing latency of the traditional four-step random access can be effectively reduced, and meanwhile the high collision probability of the data part and the waste of some data resources in the two-step random access mechanism can be avoided. The terminal obtains the random access mechanism configuration information configured by the base station for the terminal, and then performs a random access process based on the configuration information. Therefore, the terminal can select the random access mechanism according to the service condition of the terminal itself, thereby improving the reliability of random access.

Figure 6:
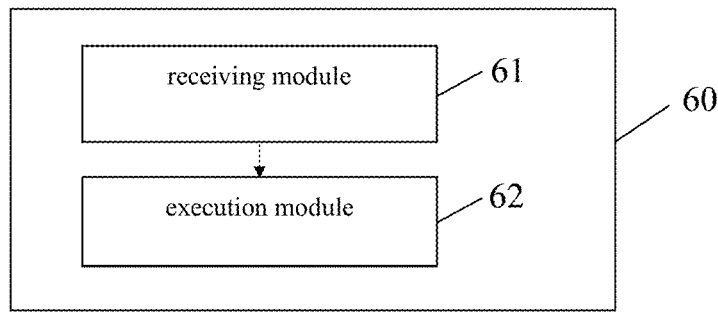
FIG. 6 shows a schematic block diagram of a terminal according to some embodiments of the present disclosure.

As shown in FIG. 6, some embodiments of the present disclosure provide a terminal 60, which includes: a receiving module 61, configured to receive random access mechanism configuration information sent by a base station, wherein the random access mechanism configuration information includes a random access type and random access time-frequency resource information corresponding to the random access type, and the random access type includes a first random access mechanism and/or a second random access mechanism; and an execution module 62, configured to perform a random access process of the first random access mechanism or the second random access mechanism according to the random access mechanism configuration information.

Optionally, the random access time-frequency resource information includes at least one of a cell-level random access time-frequency resource and a user-level random access time-frequency resource.

Specifically, in a case that the random access type includes the first random access mechanism and the second random access mechanism, and the random access time-frequency resource information corresponding to the random access type is the cell-level random access time-frequency resource, the execution module 62 is configured to: determine, according to a service requirement of the terminal, whether the random access mechanism used by the terminal performing a random access is the first random access mechanism or the second random access mechanism, and perform the random access process of the selected first random access mechanism or the selected second random access mechanism, wherein the service requirement includes a service latency requirement and/or a service reliability requirement; or randomly determine one of the first random access mechanism and the second random access mechanism as the random access mechanism used by the terminal performing a random access, and perform the random access process.

Specifically, in a case that the random access time-frequency resource information corresponding to the random access type is the user-level random access time-frequency resource, the execution module 62 is configured to: trigger the random access process of the first random access mechanism or the second random access mechanism by using a preset preamble on the random access time-frequency resource specified in the random access mechanism configuration information.

Specifically, in a case that the random access type includes the first random access mechanism and the second random access mechanism, the random access time-frequency resource information corresponding to the first random access mechanism and the random access time-frequency resource information corresponding to the second random access mechanism are configured on the same or different sub-bands.

Specifically, in a case that the random access type includes the second random access mechanism, a preamble and data of the second random access mechanism are configured in a time division multiplexing manner or a frequency division multiplexing manner.

Specifically, in a case that the random access type includes the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot.

Specifically, the random access mechanism configuration information further includes a preamble allocated for the random access type, a preset random access preamble is divided into a first set and a second set, the first set corresponds to the first random access mechanism, and the second set corresponds to the second random access mechanism.

Optionally, the receiving module 61 is configured to receive the random access mechanism configuration information notified by the base station through a downlink broadcast channel or a downlink dedicated control signaling.

It should be noted that the embodiment of the terminal is a terminal corresponding to the foregoing method embodiments in a one-on-one correspondence, all the implementations in the foregoing method embodiments are applicable to the embodiment of the terminal, and the same technical effects can be achieved.

Figure 7:
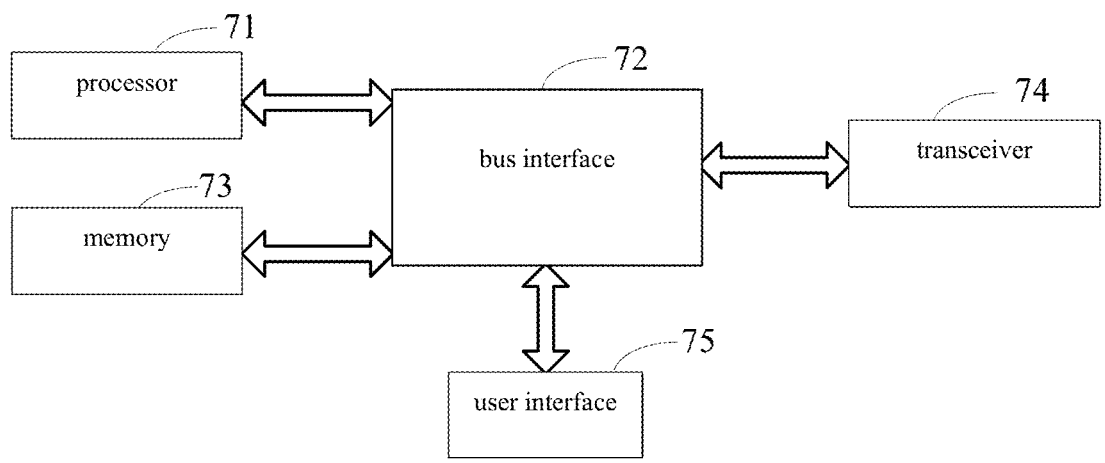
FIG. 7 shows a schematic structural diagram of a terminal according to some embodiments of the present disclosure.

As shown in FIG. 7, some embodiments of the present disclosure provide a terminal, which includes a processor 71, and a memory 73 connected to the processor 71 via a bus interface 72, wherein the memory 73 is configured to store programs and data used by the processor 71 in performing operations. When the programs and data stored in the memory 73 are called and executed by the processor 71, the following processes are performed: a transceiver 74 receiving random access mechanism configuration information sent by a base station, wherein the random access mechanism configuration information includes a random access type and random access time-frequency resource information corresponding to the random access type, and the random access type includes a first random access mechanism and/or a second random access mechanism; and performing a random access process of the first random access mechanism or the second random access mechanism according to the random access mechanism configuration information.

The transceiver 74 is connected to the bus interface 72, and configured to receive the random access mechanism configuration information under the control of the processor 71.

It should be noted that in FIG. 7, the bus architecture may include any number of interconnected buses and bridges, which are specifically linked together by various circuits of one or more processors represented by the processor 71 and memories represented by the memory 73. The bus architecture may also link various other circuits such as peripherals, voltage regulators, and power management circuits, which are well known in the art, and therefore are not further described herein. The bus interface provides interfaces. The transceiver 74 may include a plurality of components, including a transmitter and a transceiver, and provide units for communicating with various other devices on a transmission medium. For different terminals, the user interface 75 may also be an interface capable of externally/internally connecting with the required devices, the connected devices including but being not limited to a keypad, a display, a speaker, a microphone, and a joystick. The processor 71 is responsible for managing the bus architecture and the normal processing, and the memory 73 can store data used by the processor 71 in performing operations.

It should be understood by those skilled in the art that all or part of the steps of implementing the above embodiments may be implemented by hardware, or may be implemented by a computer program instructing a related hardware. The computer program includes instructions for executing some or all of the steps in the above method, and the computer program may be stored in a readable storage medium, which may be any form of storage medium.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A random access method, comprising:
receiving random access mechanism configuration information sent by a base station, wherein the random access mechanism configuration information comprises a random access type and random access time-frequency resource information corresponding to the random access type, and the random access type comprises a first random access mechanism and/or a second random access mechanism; and
performing a random access process of the first random access mechanism or the second random access mechanism according to the random access mechanism configuration information;
wherein in a case that the random access type comprises the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot.

2. The random access method according to claim 1, wherein the random access time-frequency resource information comprises at least one of a cell-level random access time-frequency resource and a user-level random access time-frequency resource.

3. The random access method according to claim 2, wherein in a case that the random access type comprises the first random access mechanism and the second random access mechanism, and the random access time-frequency resource information corresponding to the random access type is the cell-level random access time-frequency resource, the performing the random access process of the first random access mechanism or the second random access mechanism according to the random access mechanism configuration information further comprises:

determining, according to a service requirement of a terminal, whether the random access mechanism used by the terminal performing a random access is the first random access mechanism or the second random access mechanism, and performing the random access process of the selected first random access mechanism or the selected second random access mechanism, wherein the service requirement comprises a service latency requirement and/or a service reliability requirement; or randomly determining one of the first random access mechanism and the second random access mechanism as the random access mechanism used by the terminal performing a random access, and performing the random access process.

4. The random access method according to claim 2, wherein in a case that the random access time-frequency resource information corresponding to the random access type is the user-level random access time-frequency resource, the performing the random access process of the first random access mechanism or the second random access mechanism according to the random access mechanism configuration information further comprises:

triggering the random access process of the first random access mechanism or the second random access mechanism by using a preset preamble on the random access time-frequency resource specified in the random access mechanism configuration information.

5. The random access method according to claim 1, wherein in a case that the random access type comprises the first random access mechanism and the second random access mechanism, the random access time-frequency resource information corresponding to the first random access mechanism and the random access time-frequency resource information corresponding to the second random access mechanism are configured on the same or different sub-bands.

6. The random access method according to claim 1, wherein in a case that the random access type comprises the second random access mechanism, a preamble and data of the second random access mechanism are configured in a time division multiplexing manner or a frequency division multiplexing manner.

7. The random access method according to claim 1, wherein the random access mechanism configuration information further comprises a preamble allocated for the random access type, a preset random access preamble is divided into a first set and a second set, the first set corresponds to the first random access mechanism, and the second set corresponds to the second random access mechanism.

8. The random access method according to claim 1, wherein the receiving the random access mechanism configuration information sent by the base station comprises:

receiving the random access mechanism configuration information notified by the base station through a downlink broadcast channel or a downlink dedicated control signaling.

9. A non-volatile storage medium, wherein computer instructions and data are stored in the non-volatile storage medium, wherein the computer instructions are called and executed by a processor to perform the method according to claim 1.

10. A terminal, comprising: a processor, a memory connected to the processor via a bus interface and configured to store computer instructions and data used by the processor in performing operations, wherein the computer instructions are called and executed by the processor to:

receive random access mechanism configuration information sent by a base station, wherein the random access mechanism configuration information comprises a random access type and random access time-frequency resource information corresponding to the random access type, and the random access type comprises a first random access mechanism and/or a second random access mechanism; and perform a random access process of the first random access mechanism or the second random access mechanism according to the random access mechanism configuration information;

wherein in a case that the random access type comprises the first random access mechanism and the second random access mechanism, and a preamble and data of the second random access mechanism are configured in a frequency division multiplexing manner, the random access time-frequency resource information corresponding to the first random access mechanism and the random access time-frequency resource information corresponding to the second random access mechanism are configured by using the same sub-band and time slot.

11. The terminal according to claim 10, wherein the random access time-frequency resource information comprises at least one of a cell-level random access time-frequency resource and a user-level random access time-frequency resource.

12. The terminal according to claim 11, wherein in a case that the random access type comprises the first random access mechanism and the second random access mechanism, and the random access time-frequency resource information corresponding to the random access type is the cell-level random access time-frequency resource, the computer instructions are called and executed by the processor to:

determine, according to a service requirement of the terminal, whether the random access mechanism used by the terminal performing a random access is the first random access mechanism or the second random access mechanism, and perform the random access process of the selected first random access mechanism or the selected second random access mechanism, wherein the service requirement comprises a service latency requirement and/or a service reliability requirement; or randomly determine one of the first random access mechanism and the second random access mechanism as the random access mechanism used by the terminal performing a random access, and perform the random access process.

13. The terminal according to claim 11, wherein in a case that the random access time-frequency resource information corresponding to the random access type is the user-level random access time-frequency resource, the computer instructions are called and executed by the processor to:

trigger the random access process of the first random access mechanism or the second random access mechanism by using a preset preamble on the random access time-frequency resource specified in the random access mechanism configuration information.

14. The terminal according to claim 10, wherein in a case that the random access type comprises the first random access mechanism and the second random access mechanism, the random access time-frequency resource information corresponding to the first random access mechanism and the random access time-frequency resource information corresponding to the second random access mechanism are configured on the same or different sub-bands.

15. The terminal according to claim 10, wherein in a case that the random access type comprises the second random access mechanism, a preamble and data of the second random access mechanism are configured in a time division multiplexing manner or a frequency division multiplexing manner.

16. The terminal according to claim 10, wherein the random access mechanism configuration information further comprises a preamble allocated for the random access type, a preset random access preamble is divided into a first set and a second set, the first set corresponds to the first random access mechanism, and the second set corresponds to the second random access mechanism.

17. The terminal according to claim 10, wherein the computer instructions are called and executed by the processor to:
    receive the random access mechanism configuration information notified by the base station through a downlink broadcast channel or a downlink dedicated control signaling.

\* \* \* \* \*